(12) United States Patent
Schulz

(10) Patent No.: US 10,848,201 B2
(45) Date of Patent: Nov. 24, 2020

(54) CLOUD-BASED ACOUSTIC ECHO CANCELLER

(71) Applicant: Mitel Cloud Services, Inc., Mesa, AZ (US)

(72) Inventor: Dieter Schulz, Dunrobin (CA)

(73) Assignee: Mitel Cloud Services, Inc., Mesa, AZ (US)

( * ) Notice: Subject to any disclaimer, the term of this patent is extended or adjusted under 35 U.S.C. 154(b) by 0 days.

(21) Appl. No.: 16/584,483

(22) Filed: Sep. 26, 2019

(65) Prior Publication Data

US 2020/0021329 A1    Jan. 16, 2020

Related U.S. Application Data

(62) Division of application No. 15/837,118, filed on Dec. 11, 2017, now Pat. No. 10,439,673.

(51) Int. Cl.
| | | |
|---|---|---|
| *H04M 9/08* | (2006.01) | |
| *H04B 3/23* | (2006.01) | |
| *G10L 21/0232* | (2013.01) | |
| *G10L 21/0208* | (2013.01) | |

(52) U.S. Cl.
CPC .......... *H04B 3/237* (2013.01); *G10L 21/0232* (2013.01); *H04M 9/082* (2013.01); *G10L 2021/02082* (2013.01)

(58) Field of Classification Search
CPC ..... H04B 3/237; H04M 9/082; G10L 21/0232
See application file for complete search history.

(56) References Cited

U.S. PATENT DOCUMENTS

| | | | | |
|---|---|---|---|---|
| 6,504,838 B1* | 1/2003 | Kwan | ..................... | G10L 25/90 370/352 |
| 2003/0223574 A1* | 12/2003 | Schulz | .................. | H04M 9/082 379/406.01 |
| 2004/0120510 A1* | 6/2004 | LeBlanc | ............... | H04M 9/082 379/406.01 |
| 2007/0091873 A1* | 4/2007 | LeBlanc | ................. | H04L 47/11 370/352 |
| 2010/0198590 A1* | 8/2010 | Tackin | ............... | H04L 12/6418 704/214 |
| 2015/0043361 A1* | 2/2015 | Rabipour | ................. | H04B 3/23 370/252 |
| 2015/0043571 A1* | 2/2015 | Rabipour | ............... | H04B 3/235 370/352 |

* cited by examiner

*Primary Examiner* — Simon King

(57) ABSTRACT

A cloud based echo canceller is set forth for recreating an estimate of a lost packet or data at a server without requiring redundant data over the network or freezing operation of the echo canceller. In an exemplary embodiment, the echo cancelling function is not located in a single device, but is shared between the end-point and a cloud service, where the function of the end-point is to provide a time synchronized copy of the signal from the end-point loudspeaker and the signal received by the end-point microphone. Consequently, the high CPU intensive operations can be offloaded to a server such as a cloud server. In addition, several users can share the echo canceller, thereby reducing the cost of the overall function. According to an additional aspect, a further synchronization block is provided, in the form of a packet estimator, to compensate for packet or data loss in the send direction.

13 Claims, 6 Drawing Sheets

Fig. 5
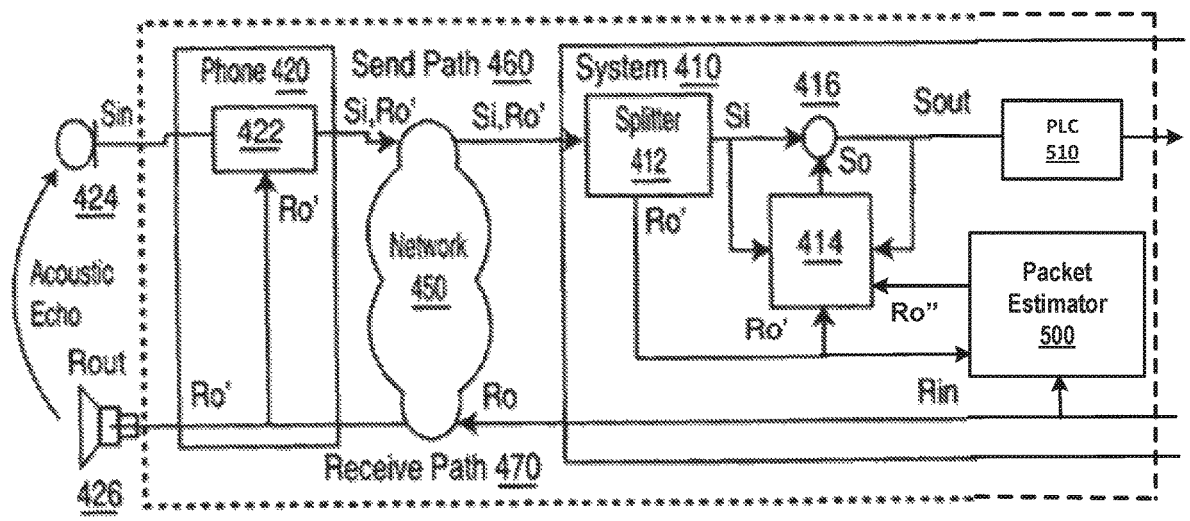
Fig. 6A
Fig. 6B
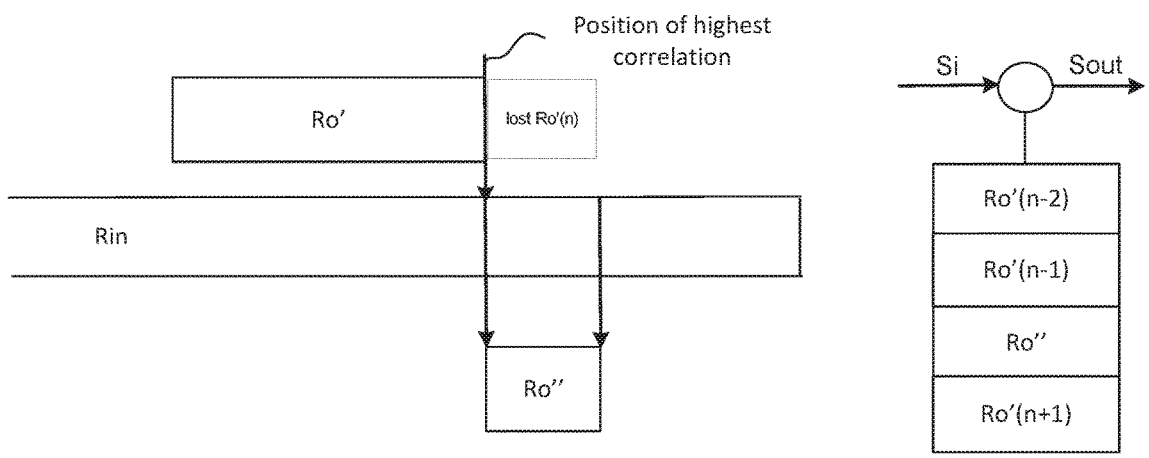

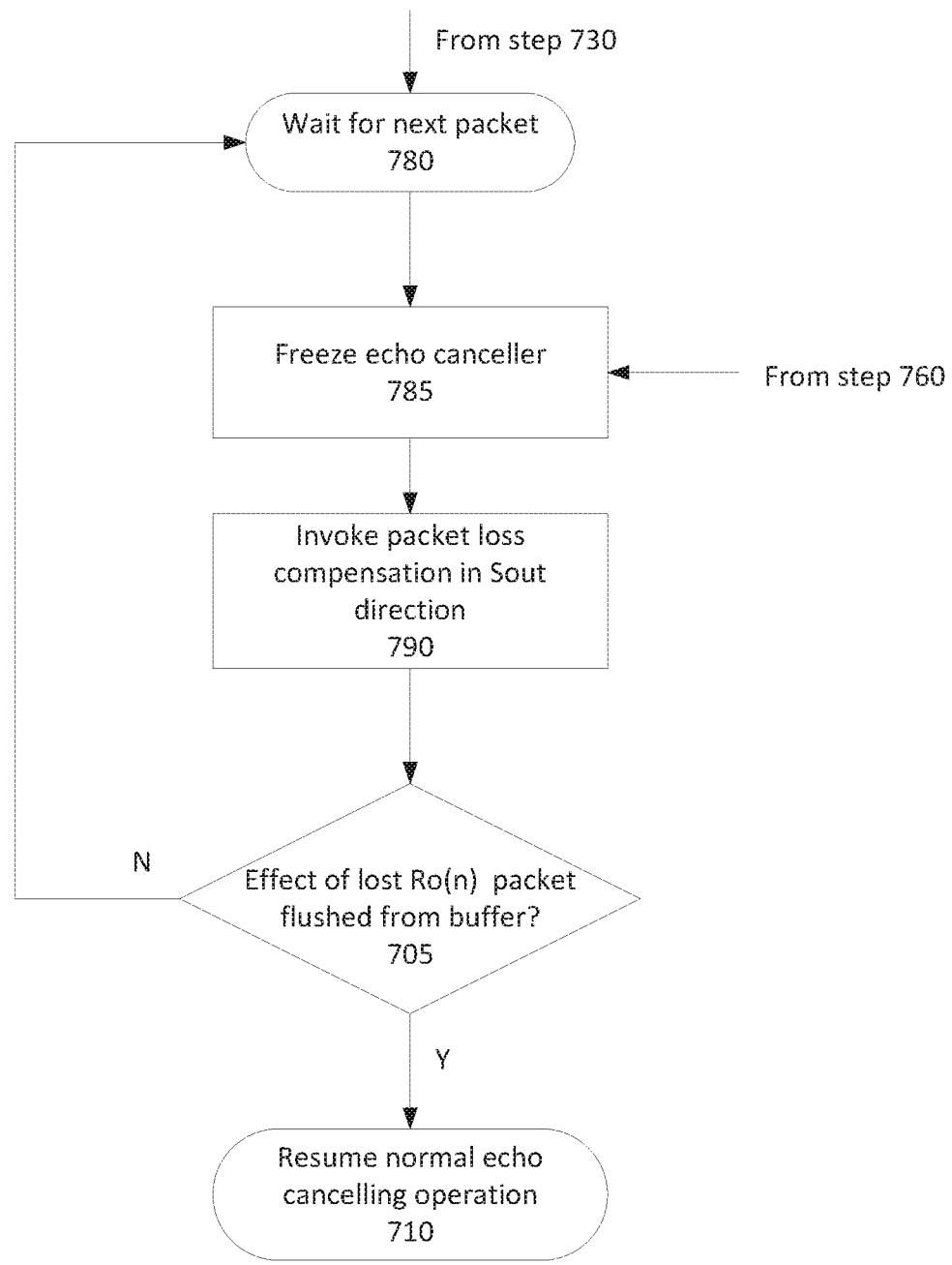

CLOUD-BASED ACOUSTIC ECHO CANCELLER

CROSS REFERENCE TO RELATED APPLICATION

This application is a divisional of and claims priority to U.S. patent application Ser. No. 15/837,118, filed on Dec. 11, 2017, the disclosure of which is hereby incorporated herein by reference.

TECHNICAL FIELD

This application relates to echo cancelling and in particular to a distributed cloud-based echo canceller.

BACKGROUND

The purpose of echo cancelling is to compensate a signal for echoes caused by various sources including feedback from a speaker in close proximity to a microphone. In general, prior art echo cancellers use a reference signal to determine the echoes and accordingly compensate the signal by removing (subtracting) an estimate of the echoes from the signal. For example, it is known in the prior art to minimize echo by implementing an acoustic echo canceller (AEC) algorithm in the communication end-point (e.g. an IP phone).

Traditionally echo cancelling resources are provided within the communication end-point. For example, ITU-T Recommendation G.167, "Acoustic Echo Controllers stipulates that an echo canceller be provided in the end-point (e.g. phone) to separate the signals of near-end talkers from the signal generated by the loudspeaker, in order to cancel the acoustic echo.

Prior art AEC algorithms are well known (see for example "Adaptive Filter Theory", 3rd edition, Simon Haykin, Prentice Hall, 1996. ISBN 0-13-322-760-X).

Providing every end-point in a communication system with speakerphone capability that requires expensive echo cancelling resources inflates the cost of the end-point. Moreover, much of the time the phone will not be operated in speakerphone mode, with the result that the expensive echo cancelling resources remain unused.

U.S. Pat. No. 7,085,374 sets forth an echo canceller that is distributed over several processing elements, such as servers, or PBX's, thereby eliminating the prior art requirement that the AEC algorithm reside in the end-point. Since echo cancelling is a time synchronous operation (that is, the signal transmitted out of the loudspeaker needs to be time synchronized with the echo signal received by the microphone for optimal performance), and since packet networks tend to be asynchronous in nature, U.S. Pat. No. 7,085,374 sets forth a system that provides a time synchronized copy of the signal playing out of the loudspeaker (Rout) and the signal received by the microphone (Sin). This ensures the synchronous relationship in time that is a pre-requisite for adaptive filtering.

However, the mechanism set forth in U.S. Pat. No. 7,085,374 is susceptible to errors resulting from packet or data loss in the send direction (from the end-point to the server). To address this, U.S. Pat. No. 7,085,374 teaches either "freezing" operation of the echo canceller or sending redundant data.

With the advent of cloud based processing and FaaS (Function-as-a-Service), it is possible to move much of the communications processing from the end-point to a cloud server, such as Amazon Web Services (AWS). By moving most of the processing to the cloud, the high processing capabilities of cloud services can be leveraged to provide high quality algorithms that can be shared by multiple end-points. However, to effectively implement the AEC algorithm on the cloud, the problem of packet or data loss in the send direction must be addressed.

SUMMARY

An aspect of this specification sets forth a method of cloud based echo cancellation that re-creates an estimate of a lost packet or data at the server side while eliminating the prior art requirement for redundant data over the network or freezing operation of the echo canceller. As discussed in greater detail below, the echo cancelling function is not located in a single device, but is shared between the end-point and the cloud service. The function of the end-point is simply to provide a time synchronized copy of the signal playing out of the loudspeaker (Rout) and the signal received by the microphone (Sin). Consequently, several users can share the echo canceller, thereby reducing the cost of the overall function.

As with prior art U.S. Pat. No. 7,085,374, the echo canceller is independent of network delay and be made more robust towards packet/frame loss, thereby simplifying design and improving speech quality. According to an additional aspect, a further synchronization block is added in the send direction, in the form of a packet estimator, to counter packet or data loss in the send direction.

Also, according to an aspect of this specification high CPU intensive operations can be offloaded to a cloud based echo canceler such that several users can share the echo canceller, thereby reducing the cost of the overall function.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

FIG. 5 is a block diagram of a cloud based echo canceller that compensates for packet/data loss in the send direction by creating an estimated data packet, according to an alternative embodiment.

FIG. 6A is a timing diagram for determining the estimated data packet and FIG. 6B is a block diagram of a buffer (echo canceller history) for storing successive data packets used to determine the estimated data packet.

FIGS. 7A, 7B and 7C, in combination, show a flow chart of steps in a method for handling packet/data loss by creating an estimated data packet, using the cloud based echo canceller of FIG. 5.

DESCRIPTION OF THE APPLICATION

The description set forth below in connection with the appended drawings is intended as a description of presently preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Figure 1:
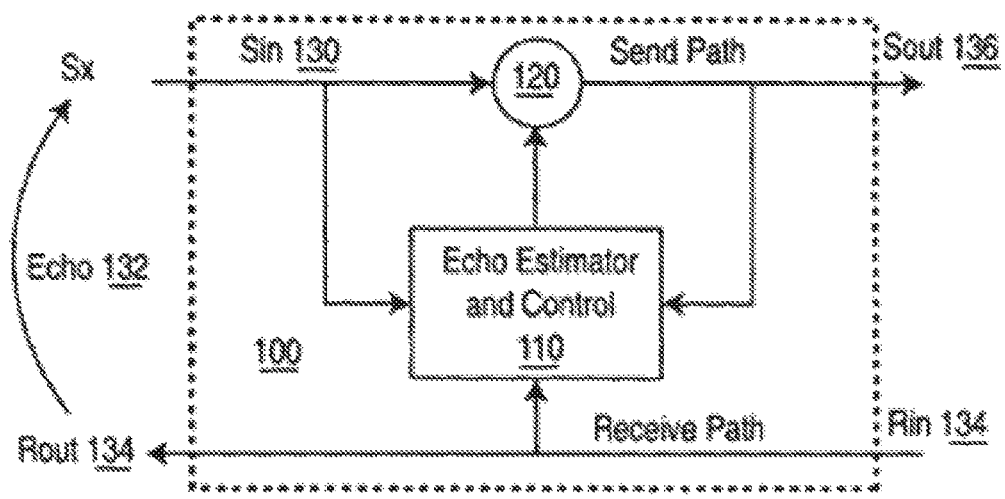
FIG. 1 is a block diagram of a prior art echo canceller.

Referring to FIG. 1, there is shown a block diagram of a conventional echo canceller 100. The conventional echo canceller 100 comprises an echo estimator and control 110 and a subtractor 120. An input signal (Sin 130) is a combination of an Echo 132 (the echoes) and the near end signal. As is known in the art, the echo estimator and control 110 uses the reference signal (Rout or Rin) 134 and the subtractor 120 to remove an estimate of the echo from the input signal 130. The goal of the echo canceller is to create an output signal (Sout 136) that matches the near end signal as closely as possible with the echo sufficiently reduced.

Figure 2:
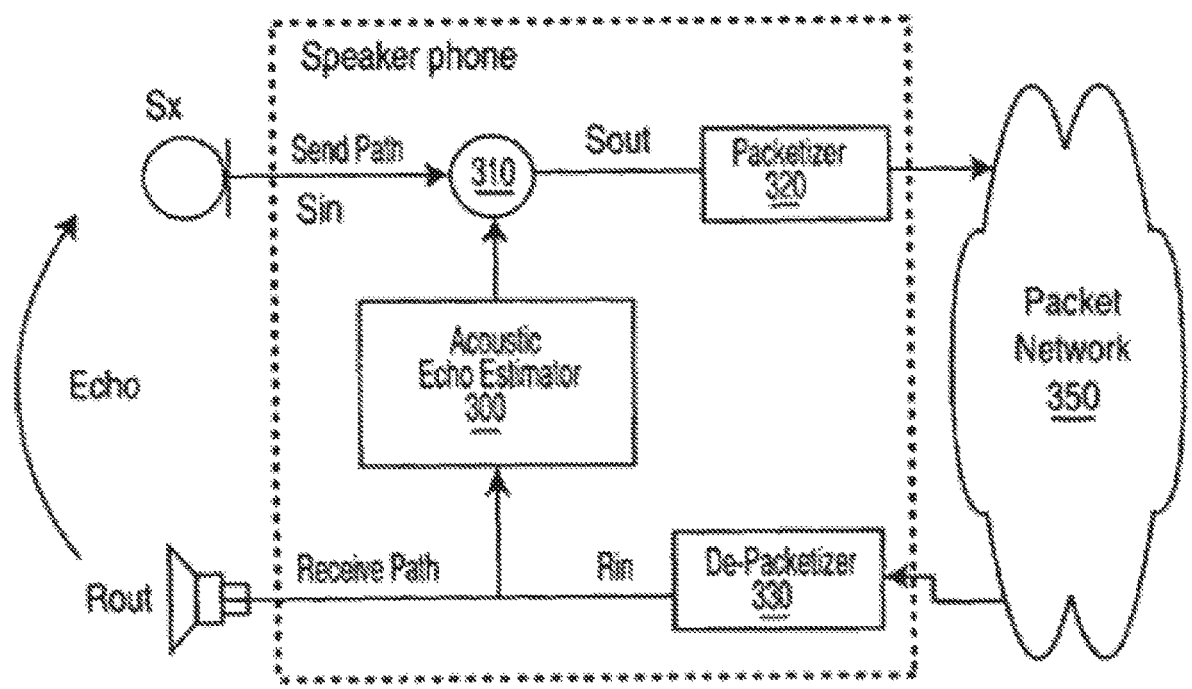
FIG. 2 is a block diagram of a prior art distributed acoustic echo canceller for a packet network.

Referring to FIG. 2, there is shown a block diagram of a conventional packet network based acoustic echo canceller 300 for connection with a packet network 350. In packet networks, line echo is typically cancelled at IP/PSTN gateways (not shown). The canceller 300 comprises an acoustic echo estimator 300, a subtractor 310, a packetizer 320 and de-packetizer 330. As discussed above, the packet network based acoustic echo canceller of FIG. 2 is distributed over several processing elements whereas the echo-cancelling resources of the conventional echo canceller 100 of FIG. 1 are located on the phone, which increases the cost.

In the prior art echo canceller of FIG. 2, the loudspeaker and microphone signals are typically sampled using a local clock reference. However, in a packet based network the incoming packets are typically not synchronized to the local clock. De-packetizer 330 converts the packet data into a synchronous voice stream Rin that is sent to the loudspeaker. Typically, the depacketizer compensates for lost packets/frame erasure, and clock drift (sampling rate adjustment). Packetizer 320 packetizes the signal received from microphone and transmits it to the packet network 350

Figure 3:
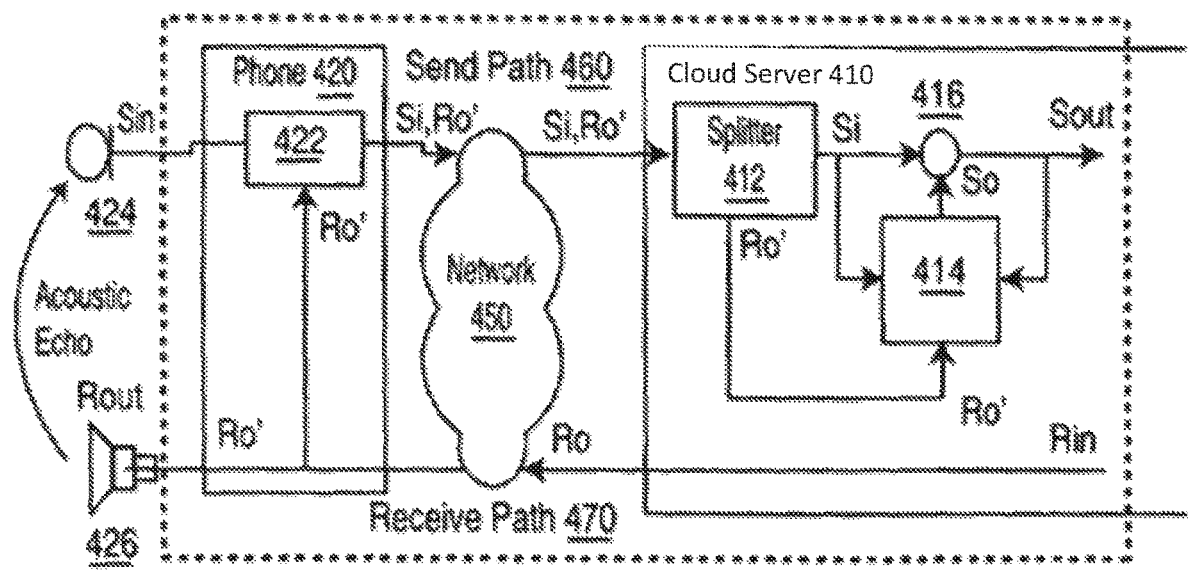
FIG. 3 is a block diagram showing a cloud based echo canceller according to an exemplary embodiment.

Referring to FIG. 3, there is shown a block diagram of a distributed cloud based echo canceller 400 in accordance with an exemplary embodiment. In the distributed cloud configuration of FIG. 3, the echo canceling resources are shared between the end-point and the cloud service over various devices, although a cloud server 410 hosts the main echo cancelling functions.

The cloud server 410 includes a splitter 412, an acoustic echo estimator and control 414 and a subtractor 416. The cloud server 410 may, for example, be implemented using AWS. An end point 420 includes a signal combiner 422, a microphone 424, and a loudspeaker 426. The acoustic echo estimator and control 414 will be understood by a person of ordinary skill in the art to be an adaptive filter (see for example "Adaptive Filter Theory", 3rd edition, Simon Haykin, Prentice Hall, 1996. ISBN 0-13-322-760-X).

The cloud server 410 sends a first reference signal Ro to the end point 420 via a network 450. The first reference signal Ro may be delayed and potentially corrupted by network 450 (such as packet loss/frame erasure compensation/vocoding/delay jitter) when it arrives at the end point 420 as a second reference signal Ro'. The second reference signal Ro' is sent to the loudspeaker 426 of the end point 420. Due to acoustic coupling, a first signal Si (equivalent to Sin), comprising a near end signal (such as a voice signal) and an acoustic echo signal, is picked up at the microphone 424. This first signal Si, in conjunction with the transmitted signal Ro', is sent back to the cloud server 410.

At the cloud server 410, the splitter 412 splits the combined signal Si, Ro' and the second reference signal Ro' is used as a reference signal in the acoustic echo estimator and control 414, resulting in echo cancelled signal So. The splitter 412 further monitors the incoming signal (Si, Ro') for lost packets and other corruption, and controls the acoustic echo estimator and control 414 accordingly. In the event of packet of data loss an estimated packet is calculated and inserted into the echo canceller history so that the echo canceller can keep functioning, as described in greater detail below.

The echo canceller of FIG. 3 is not affected by any network delays since Ro' (and not Ro) is used as the reference signal. Furthermore, non-linear effects in the receive path such as packet loss and jitter adjustment are not relevant since the system provides an exact copy of the reference signal after network effects (Ro') that is sent to the loudspeaker. Packet loss in the send path (Si+Ro') can be determined by the network protocol. Consequently, the echo canceller of FIG. 3 is immune to network delay, delay jitter etc. and can be made robust with regard to packet loss/frame erasure.

Figure 4:
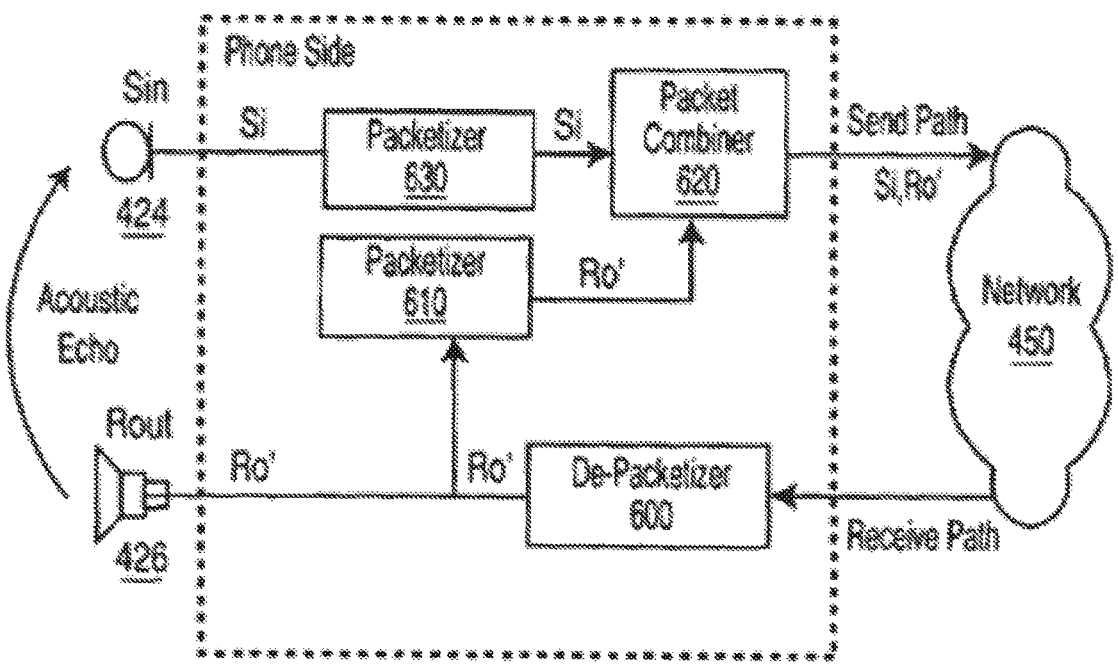
FIG. 4 is a block diagram showing additional details of an embodiment of end-point in the cloud based echo canceller of FIG. 3.

Referring to FIG. 4, there is shown a block diagram of a more detailed view of the end point side of FIG. 3. A de-packetizer 600 converts packet data into the second reference signal Ro' that is sent to the loudspeaker 426. The de-packetizer 600 compensates for network effects such as lost packets/frame erasure and clock drift (sampling rate adjustment), and optionally decodes compressed voice (e.g. according to any of a number of well-known voice compression standards such as ITU standards G.711, G.729, G.732.1, etc.) Because of these network effects, received packets may be corrupted and are consequently indicated by the second reference signal Ro'. Packetizer 610 converts the second reference signal Ro' sent to the loudspeaker 426 back into packet data for a packet combiner 620. Packetizer 630 packetizes the signal Si received from the microphone 424. Both packets are then combined by the packet combiner 620 and sent over the network 450. The packetizers 610, 630 respectively digitize the signal Si and the second reference signal Ro' (synchronous voice streams) into packets.

As discussed above, combining a copy of Ro' with Si addresses the problem of network impairments in the receive direction. For packet/data loss in the send direction (when a Si+Ro' packet is lost), prior art U.S. Pat. No. 7,085,374 teaches freezing operation of the echo canceller until the packet loss effect is flushed out of the echo canceler history, or sending redundant data in subsequent packets. According to the embodiment illustrated in FIG. 5, the problem of packet/data loss in the send direction is addressed through the addition of a further synchronization block, packet estimator 500, for creating an estimate of Ro' (Ro") from the existing Rin data.

Figure 7A:
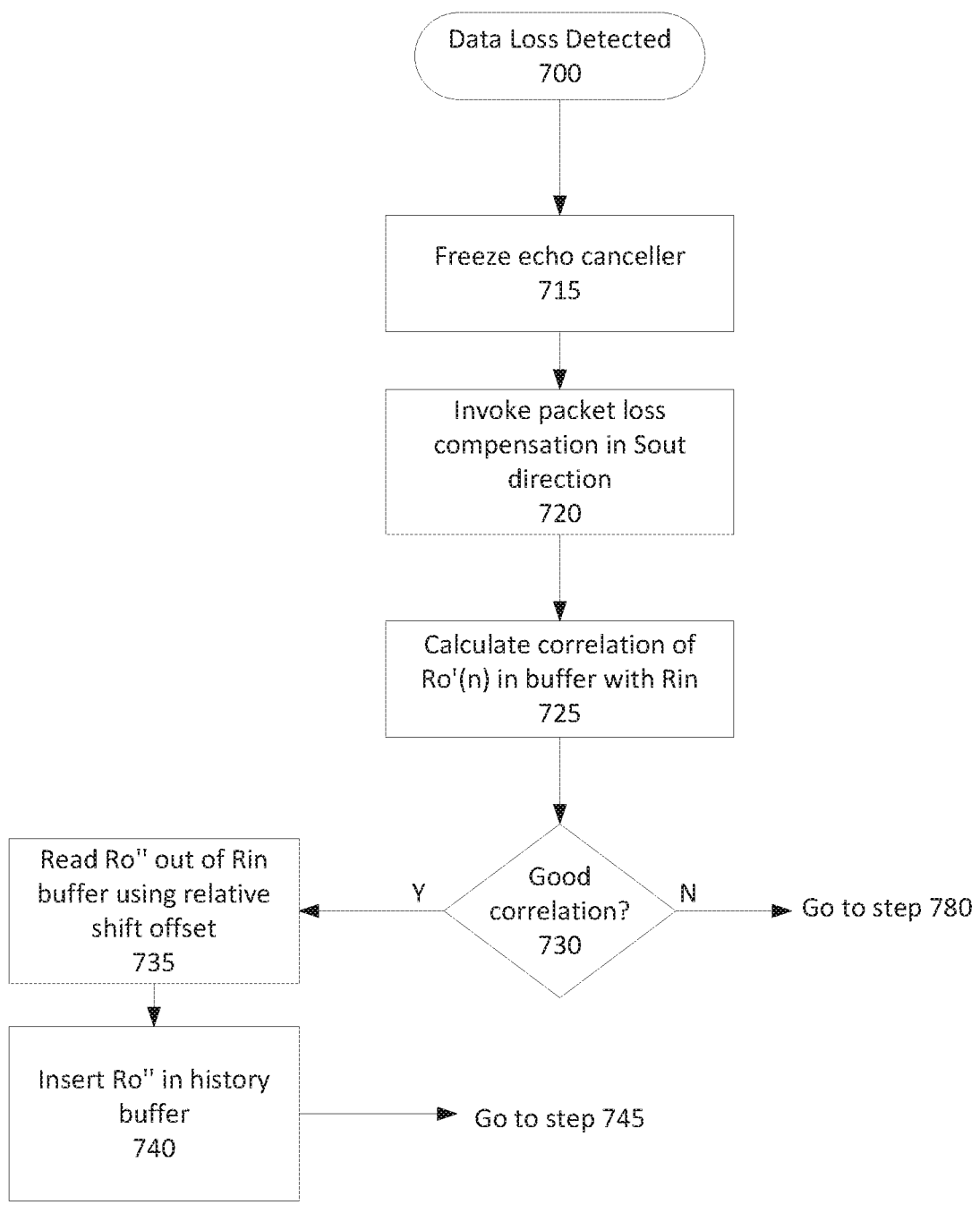
Figure 7B:
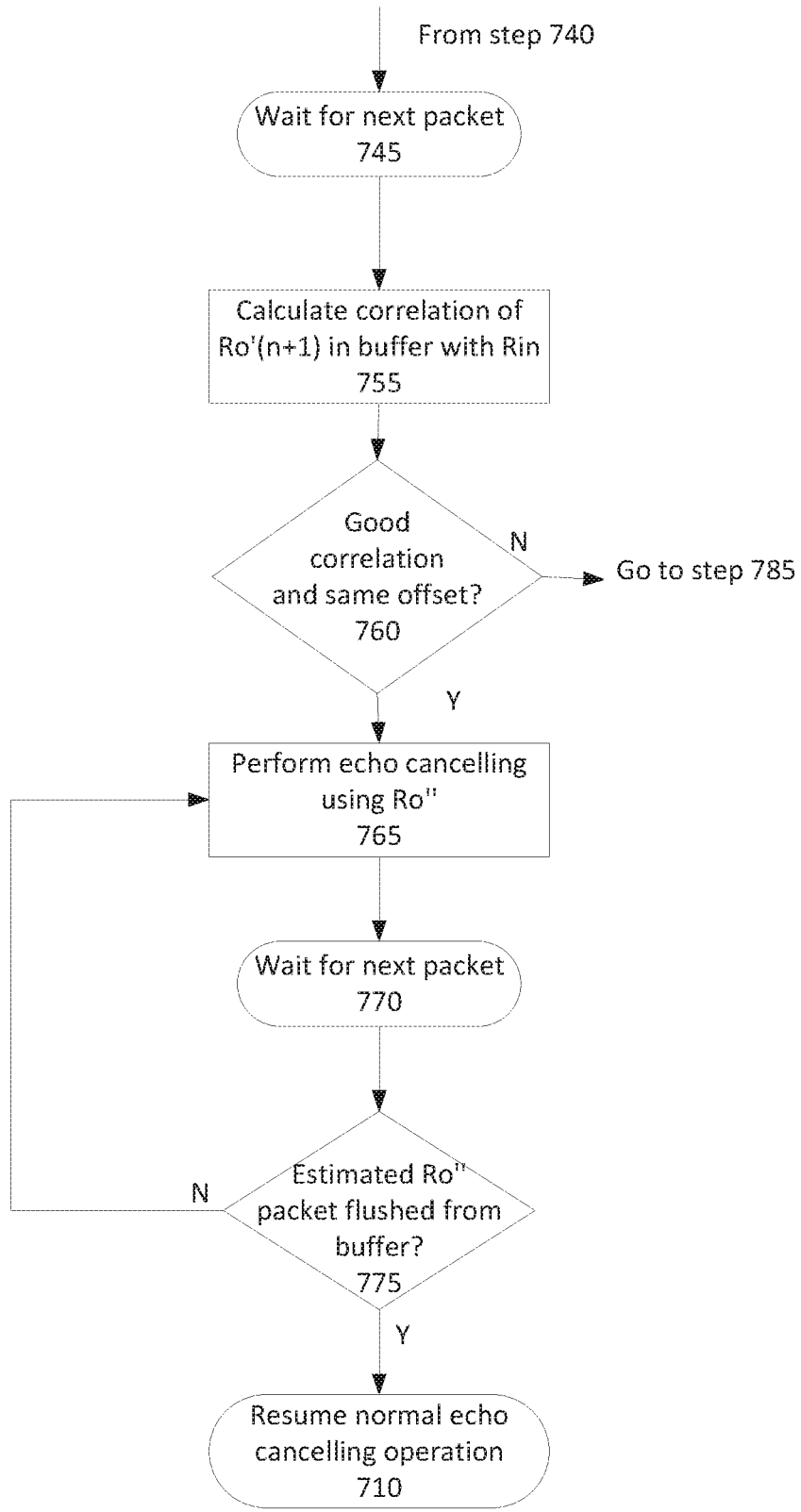

A description of the operation of the echo canceler shown in FIG. 5 is provided below, with reference to FIG. 6A which is a timing diagram for determining the estimated packet Ro", FIG. 6B which is a diagram showing echo canceller history buffer at time n+1, in conjunction with the method steps illustrated in FIG. 7.

Thus, when packet estimator 500 detects loss of the packet with Ro'(n), at step 700, the operation of the echo canceller is frozen (i.e. halted) for the duration of the lost data at step 715. Typically, the echo canceller operation freeze continues for the duration of ptime (packet size) on the packet network 450. For example, if the packet size is 20 ms, the method will freeze the echo canceller operation for 20 ms.

In the Sout direction, at step 720, a packet loss compensation (PLC) algorithm is invoked (PLC block 510), for either recreating an estimated Sout(n) packet calculated from the previous Sout(n−1, n−2, n−3, . . . ) packets or halting transmission of packets to the far-end, in which case the far-end will use its own PLC algorithm to compensate for the lost Sout packet.

Next, at steps 725 to 740, an estimated Ro'(n) packet is calculated.

Specifically, at step 725 the packet estimator 500 performs a correlation of the previously received Ro' with the Rin data in the server.

If, at step 730, the correlation is poor (i.e. not a strong correlation offset) this means that a good estimate for Ro'(n) is not available in the Rin data, in which case the process continues at step 780, waiting for the next packet. When the next packet arrives, the process continues by freezing the echo canceler (step 785) and invoking the PLC algorithm (step 790) until the effect of the lost Ro'(n) packet is flushed out of the echo canceler history (i.e. a YES at step 705). For example, if the size of Ro'(n) is 20 ms and the echo canceler history is 80 ms (FIG. 6B), it will take 80 ms before the effect of the lost Ro'(n) packet is flushed out of the echo canceler history. After the effect of Ro'(n) has been flushed out of the echo canceler history, the process resumes with the normal echo canceling operation (step 710).

If, at step 730, the correlation is good (see FIG. 6A), the relative shift offset of Ro' to Rin is used at step 735 to read an estimated Ro' buffer (Ro") out of the Rin buffer using the relative shift offset as starting point. Next, at step 740, the estimated Ro" buffer value is placed into the echo canceller history (see FIG. 6B) and the process continues by going to step 745, waiting for the next packet.

When the next packet arrives, another determination is made whether the estimate Ro" is a good estimate or not. Packet estimator 500 performs a further correlation at step 755 of the next packet after loss (i.e. Ro'(n+1)) with Rin).

If there is good correlation and the relative shift offset is the same as for the previous packet (i.e. a YES at step 760), thereby indicating the estimated Ro" packet continues to be valid, Ro" packet is used for further echo cancelling (step 765).

The echo canceler keeps operating with the estimated Ro" packet by waiting for the next packet (step 770) and repeating the echo cancelling operation (step 765) until the Ro" packet has been flushed out of the history (i.e. a YES at step 775). The process resumes with the normal echo canceling operation (step 710).

If at step 760 the correlation of the subsequent packet is low, or the relative shift offset is different (i.e. a NO at step 760), which is an indication that Ro" is a poor estimate of Ro'(n) and should not be used, the process continues by freezing the echo canceler (step 785) and invoking the PLC algorithm (step 790) until the effect of the lost Ro'(n) packet is flushed out of the echo canceler history (i.e. a YES at step 705). The process then resumes with the normal echo canceling operation (step 710).

A person of ordinary skill in the art will appreciate that the system and method of echo cancellation set forth herein may be applied to line echo cancellers in gateways (i.e. the gateway provides the synchronized Ro' and Si signals that are then sent to the cloud server for further processing). Applications therefore include thin clients using cloud services such as AWS, IP-to-TDM gateways using "thin" line/trunk cards, cloud based PBX systems, etc.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method of compensating for lost packets in a distributed echo canceler, where successive input packets are stored in memory of the distributed echo canceler, comprising:
   a) detecting a lost signal packet Ro'(n);
   b) freezing operation of the distributed echo canceler;
   c) invoking a packet loss compensation (PLC) algorithm for one of either recreating an estimated output packet from previous output packets or halting transmission of output packets;
   d) estimating the lost signal packet Ro'(n) by performing a correlation of a previously received signal packet with an input signal packet Rin,
   i) if said correlation is poor then
      A) upon receipt of a next packet repeating steps b) and c) until effect of the lost signal packet Ro'(n) is flushed out of an echo canceler memory and resuming operation of the distributed echo canceler; or
   ii) if said correlation is good then
      B) using a relative shift offset of the lost signal packet Ro'(n) to the input signal packet Rin to read an estimated buffer value (Ro") out of the successive input packets and replacing the signal packet Ro'(n) by the estimated buffer value (Ro") and resuming operation of the distributed echo canceler using the estimated buffer value (Ro");
      C) upon receipt of a next packet Ro'(n+1) calculating the correlation of the next packet Ro'(n+1) with the input signal packet Rin;
      D) if the correlation at step C) is poor then repeating step A); or
      E) if the correlation at step C) is good and the relative shift offset remains the same resuming operation of the distributed echo canceler using the estimated buffer value (Ro") until effect of the lost signal packet Ro'(n) is flushed out of the echo canceler memory.

2. The method of claim 1, wherein operation of the distributed echo canceler is frozen at step b) for a duration (ptime) equivalent to packet size on a packet network to which the distributed echo canceler is connected.

3. The method of claim 2, wherein operation of the distributed echo canceler is frozen for approximately 20 ms for a packet size duration (ptime) of 20 ms.

4. The method of claim 3, wherein effect of the lost signal packet Ro'(n) is flushed out of the echo canceler memory is 80 ms for an echo canceler memory size of 80 ms.

5. The method of claim 1, wherein the step of invoking a packet loss compensation (PLC) algorithm comprises halting transmission of output packets.

6. The method of claim 5, wherein a far-end device uses a far-end PLC algorithm to compensate for the a lost packet.

7. The method of claim 1, wherein if the relative shift offset is different, the method further comprises repeating the step of freezing.

8. The method of claim 7, further comprising repeating the step of invoking.

9. The method of claim 1, further comprising a method of distributed echo cancelling.

10. The method of claim 9, wherein the method of distributed echo cancelling comprises:
    receiving the input signal packet Rin in response transmitting a first reference signal (Ro) from the system to a network;
    receiving a second reference signal (Ro') by at least one device that is remote from said system over said network, wherein the second reference signal comprises the first reference signal as modified by network effects due to transmission over the network;
    receiving within said at least one device a further signal (Si) containing an echo of said second reference signal (Ro');
    combining said further signal and said second reference signal at said at least one device;
    transmitting said combined signal from said at least one device to said network;
    receiving within said system the combined signal (Si+Ro');
    splitting said second reference signal (Ro') from said further signal; and
    canceling the echoes from said further signal (Si) using the second reference signal (Ro').

11. The method of claim 10, further comprising creating the estimate of the second reference signal (Ro"), wherein the step of creating comprises:
    (a) performing a correlation of the second reference signal (Ro') with the signal (Rin);
    (b1) if the second reference signal (Ro') and the signal (Rin) are correlated then using a relative shift offset of the second reference signal (Ro') to the signal (Rin) to read the estimate (Ro") from a buffer for the signal (Rin),
    inserting the estimate (Ro") into an echo canceller history buffer, and
    canceling the echoes from the further signal (Si) using the second using the estimate (Ro"); or
    (b2) if the second reference signal (Ro') and the signal (Rin) are not correlated then ceasing canceling of the echoes from the further signal (Si) and invoking a packet loss compensation algorithm until effect of the lost reference signal packet Ro'(n) is flushed from the echo canceller history buffer.

12. A method of compensating for lost packets in a distributed echo canceler, the method comprising:
    a) detecting a lost signal packet Ro'(n);
    b) freezing operation of the distributed echo canceler;
    c) invoking a packet loss compensation (PLC) algorithm for one of either recreating an estimated output packet from previous output packets and halting transmission of output packets; and
    d) estimating the lost signal packet Ro'(n) by performing a correlation of a previously received signal packet with an input signal packet Rin,
    wherein if said correlation is poor, then upon receipt of a next packet repeating steps b) and c) until effect of the lost signal packet Ro'(n) is flushed out of the echo canceler memory and resuming operation of the distributed echo canceler.

13. The method of claim 12, further comprising a step of, if said correlation is good, using a relative shift offset of the lost signal packet Ro'(n) to the input signal packet Rin to read an estimated buffer value (Ro") out of the successive input packets and replacing the signal packet Ro'(n) by the estimated buffer value (Ro") and resuming operation of the distributed echo canceler using the estimated buffer value (Ro").

* * * * *